(12) United States Patent
Chen

(10) Patent No.: US 7,583,490 B2
(45) Date of Patent: Sep. 1, 2009

(54) STATIC ELECTRICITY DISSIPATION DEVICE FOR VEHICLES

(75) Inventor: David Z. Chen, Richardson, TX (US)

(73) Assignee: Verizon Services Organization Inc., Irving, TX (US)

( * ) Notice: Subject to any disclaimer, the term of this patent is extended or adjusted under 35 U.S.C. 154(b) by 144 days.

(21) Appl. No.: 11/553,425

(22) Filed: Oct. 26, 2006

(65) Prior Publication Data

US 2008/0112105 A1    May 15, 2008

(51) Int. Cl.
*B60C 19/08* (2006.01)
(52) U.S. Cl. ................................ 361/217; 361/220
(58) Field of Classification Search .............. 361/216, 361/217, 220
See application file for complete search history.

(56) References Cited

U.S. PATENT DOCUMENTS

| | | | | |
|---|---|---|---|---|
| 2,280,327 A | * | 4/1942 | Ware | 361/219 |
| 2,318,340 A | * | 5/1943 | Thacher et al. | 361/219 |
| 2,521,337 A | * | 9/1950 | Brummer | 361/219 |
| 2,728,032 A | * | 12/1955 | Foltz | 361/222 |
| 4,321,653 A | * | 3/1982 | Takahashi | 361/219 |
| 7,170,735 B2 | * | 1/2007 | Diskin | 361/220 |
| 2006/0187304 A1 | * | 8/2006 | Sakata | 348/148 |

FOREIGN PATENT DOCUMENTS

JP    62134350 A  *  6/1987

OTHER PUBLICATIONS

Abstract for JP62134350. Jun. 17, 1987.*

* cited by examiner

*Primary Examiner*—Ronald W Leja
*Assistant Examiner*—Christopher J Clark

(57) ABSTRACT

Apparatus and methodology for discharging static electricity from a vehicle which uses a discharge mechanism that does not contact the roadway (Earth) when the vehicle is in forward motion to reduce, or completely avoid, frictional wear on the discharge mechanism. In one embodiment, the displacement between the discharge mechanism and the roadway is obtained by way of wind force generated by the motion of the vehicle itself. A properly oriented and hinged windscreen attached to the conductive path discharge mechanism can be used for this purpose. Other embodiments including magnetically controlled lifting and holding devices can be used.

2 Claims, 4 Drawing Sheets

STATIC ELECTRICITY DISSIPATION DEVICE FOR VEHICLES

BACKGROUND OF THE INVENTION

1. Field of the Invention:

The present invention relates generally to apparatus and methodology for discharging static electricity from a vehicle and, more particularly, to avoiding wear and tear on the electrical conductor which discharges the static electricity to ground.

2. Description of Prior Art:

Static electricity buildup is a fundamental phenomenon of nature, and we all have experienced it in one form or another. Static electricity varies widely in energy level, from a miniscule level where one barely notices an annoying spark at the end of one's finger as one touches a metal object in a dry environment after walking across a carpet, all the way up to the highly dramatic and dangerous lightning flashes during a summer thunderstorm. Both are examples of static electricity discharge.

Static electricity is a bigger problem in dry climates such as the southwest U.S. than in humid climates such as the northeast U.S., because water vapor in places of high humidity forms a natural leakage path for the static electricity. All motor vehicles, trucks, cars, buses etc., can build up static electricity charge relative to ground because their rubber tires can act as insulators between the body of the vehicle and Earth.

Under the wrong conditions, motor vehicle static electricity discharge can be a hazardous event. For example, if a gasoline tanker truck builds up static charge and somehow discharges that static electricity in the presence of fumes from the gasoline in the truck, then an enormous explosion may occur. It is, therefore, important to safely discharge static electricity from vehicles.

Most of us are familiar with the image of a gasoline tanker truck driving down the highway while dragging a steel chain behind, along the roadway. This is a prior art approach which discharges the static electricity while the truck is in motion because of the scraping of the electrically-conductive metal chain against the roadway. Referring to FIG. 1 (Prior Art) truck 100 is shown with truck body 101, front wheels 102 and rear wheels 103 supported by roadway 104. Truck body 101 has a metal chain 105 mounted from a conductive contact such as an axle located underneath the truck. The chain is shown to be in substantial contact with roadway 104. This contact is maintained regardless of whether the truck is in forward motion, is stopped, or is in reverse motion. This may be an effective way to reduce static electricity buildup, but it is only good if the chain is in contact with the roadway. At some point, after a long haul across the country, or after other excessive usage, road friction eventually causes the chain to wear out, and the effective discharge path to ground through the chain becomes intermittent or non-existent. When the truck driver exits the truck through door 106 there could be a static electricity discharge through that individual to ground, if the chain had worn away during transit, and if the driver touches the truck and ground at the same time which is very likely.

Also, there are other kinds of vehicles which can benefit from a safe static discharge path. The assignee of the present invention is a telecommunications company presently involved in installing a fiber to the premises (FTTP) infrastructure. The trucks used by the assignee's installers for this purpose contain a substantial amount of sensitive fiber splicing equipment and other sensitive equipment such as, e.g., line card installation equipment. All of this equipment can be very susceptible to, and negatively affected by, static electricity buildup. Thus, in addition to being a hazard to the technician installer who is driving the truck and who can, unknowingly, form a discharge path through his/her body from the truck to ground upon opening door 106 and setting foot on the ground while touching the truck, static electricity buildup can also wreak havoc with this sensitive equipment inside the truck.

Therefore, there is a need to always have a safe discharge path for static electricity in place from the truck to ground prior to any occupants in that truck opening the door to egress. This requires a technique for avoiding wear-out of the discharge path from road friction. Applicant provides such a technique with the present invention which addresses the problems noted in the prior art.

SUMMARY OF THE INVENTION

Embodiments of the present invention include apparatus and methodology for discharging static electricity from a vehicle on a roadway. Flexible and electrically-conductive material is suspended from beneath the vehicle. The material is sufficiently long to normally be in contact with the roadway when the vehicle is stopped. The material is oriented in a direction relative to the direction of forward motion of the vehicle, and is sufficiently lightweighted, to enable a wind that is created by the forward motion to automatically lift the material from the roadway and break the contact during occurrence of the forward motion. Thereby, the static electricity is discharged from the vehicle through the material to the roadway when the vehicle is stopped, and the material does not experience frictional force from the roadway when the vehicle is moving in a forward direction. In a particular embodiment, the material can be a 6-12 inch wide (approximate) strip of flexible, non-corrosive, electrically-conductive mesh or ribbon fabricated from a suitable alloy such as, for example, stainless steel alloy, brass alloy, etc.

In another embodiment of the present invention, a wind-engagement mechanism is suspended from the vehicle and supports the material. The mechanism is oriented in a direction to encounter wind resistance when the vehicle is moving forward. This causes the mechanism to raise the material from the roadway and break the contact.

In yet another embodiment, the electrically-conductive material can be fabricated from a flexible metal rod or spring. If the material encounters debris and/or holes in the roadway when the vehicle is moving in the reverse direction, damage to the wind-engagement mechanism is avoided by the conductive material being formed from the flexible metal rod or spring, because the end of the rod or spring which makes contact with the roadway is curved upward to permit it to ride over the debris and slide over the holes. Alternatively, the end of the rod can be affixed to a rotatable and electrically conductive metal wheel which makes contact with the roadway and can roll over the debris and the holes. The rod or spring can, likewise, be made from stainless steel or brass or other suitable non-corrosive and electrically-conductive metal.

It is thus a general object of the present invention to provide an improved technique for discharging static electricity from a vehicle.

It is another general object of the present invention to provide an improved technique for discharging static electricity from a vehicle without allowing vehicle motion to wear-out the electrically conductive discharge path between the vehicle and ground.

Other objects and advantages shall become apparent after reviewing the detailed description of the preferred embodiments in conjunction with the drawings in which:

DETAILED DESCRIPTION OF THE PREFERRED EMBODIMENTS

Figure 2:
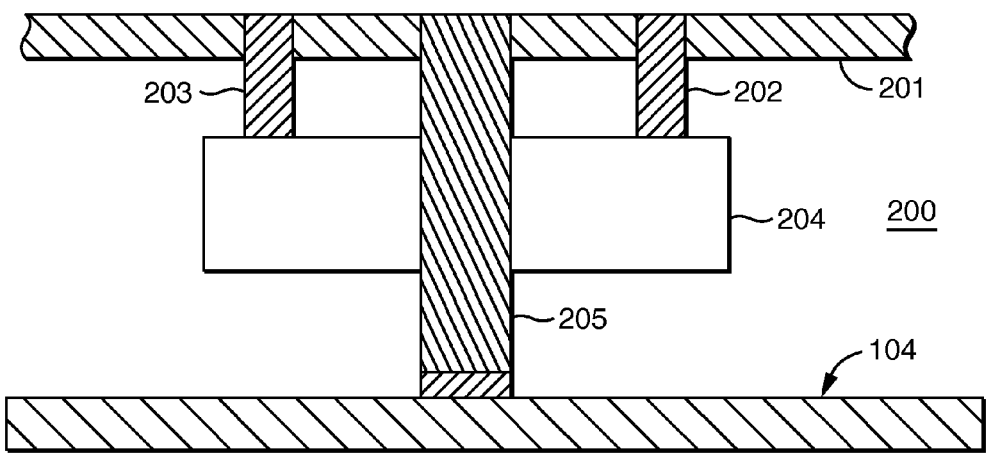
FIG. 2 is an exemplary diagram of an embodiment of the present invention when viewing it from the rear of a stationary vehicle from which it is mounted.

FIG. 2 is an exemplary diagram of an embodiment 200 of the present invention when viewing it from the rear of a stationary vehicle from which it is mounted. Axel or truck chassis 201 is located underneath the truck body (not shown in this Fig.). Connected to axel 201 is flexible, electrically conductive material strip 205 having a width of several inches and a length sufficient to touch roadway 104 when the truck is not moving, as shown. Material 205 is lightweight and can be lifted or lofted into the air by a breeze or wind created by forward movement, thereby avoiding frictional forces while the truck is moving forward. Wind-engagement screen (or sail or wing) 204 is suspended from axel 201 by flexible supports 202 and 203. Material 205 is connected to, and supported by, wind screen 204 which projects a larger surface area than material strip 205 projects by itself, and which can, therefore, catch the air flow more efficiently than that being caught by the material strip alone.

However, in another embodiment (not shown) wind screen 204 is not used and apparatus 202, 203 and 204 do not appear. Flexible material 205 is suspended solely from axel 201 and is lofted by air flow directly. In this other embodiment, as well as the embodiment of FIG. 2, stones or holes or other obstructions in the roadway during backing-up are not an issue because the flexible material merely accommodates the obstruction by flexing over or around it (e.g., a rock) or sliding through it (e.g., a pothole).

Figure 3:
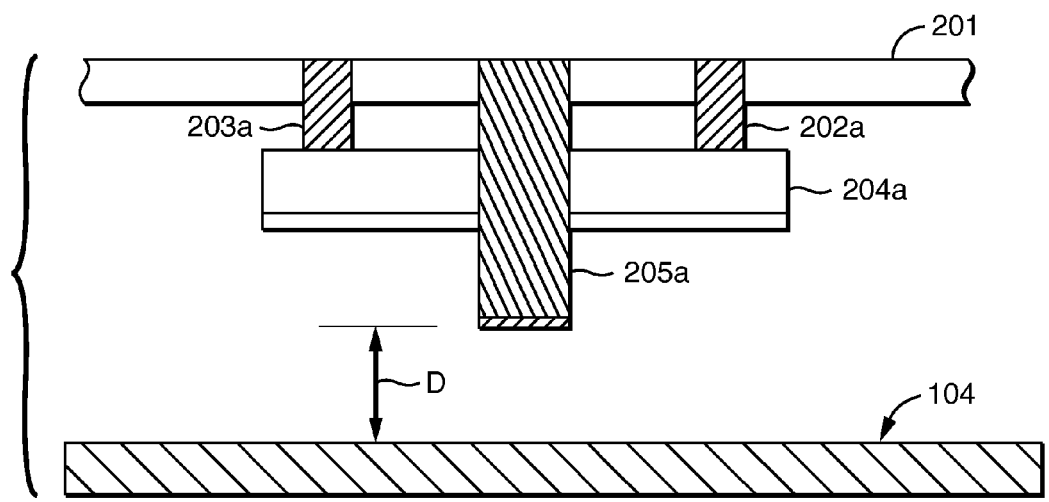
FIG. 3 is an exemplary diagram of the embodiment of FIG. 2 when viewing it from the rear of a forward-moving vehicle from which it is mounted.

FIG. 3 shows embodiment 200a, which is the apparatus of FIG. 2 from the same rear viewpoint but under conditions of a forward moving truck. (The "a" designation is used merely to suggest that FIG. 3 is the same as FIG. 2 but under a state of forward motion of the truck. The dimensions of the components look shorter in this view because the components have been raised or lofted because the truck is moving forward, but the components are otherwise identical to those of FIG. 2). In this view, material 205a is the same as material 205, but lofted so that a clearance of distance "D" is achieved between the end of material 205a and roadway 104. Windscreen 204a is suspended by flexible supports 202a and 203a from axel 201, as in FIG. 2. The bracket at the far left of FIG. 3 is merely to indicate that all that is shown in that view is within FIG. 3.

Figure 1:
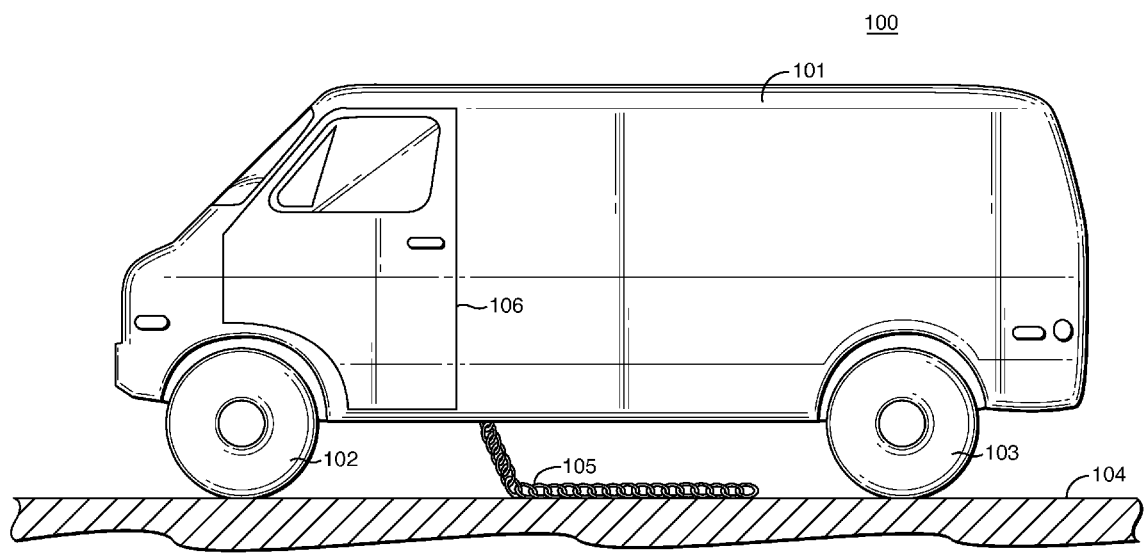
FIG. 1 shows a prior art technique for static electricity discharge from a vehicle.
Figure 4:
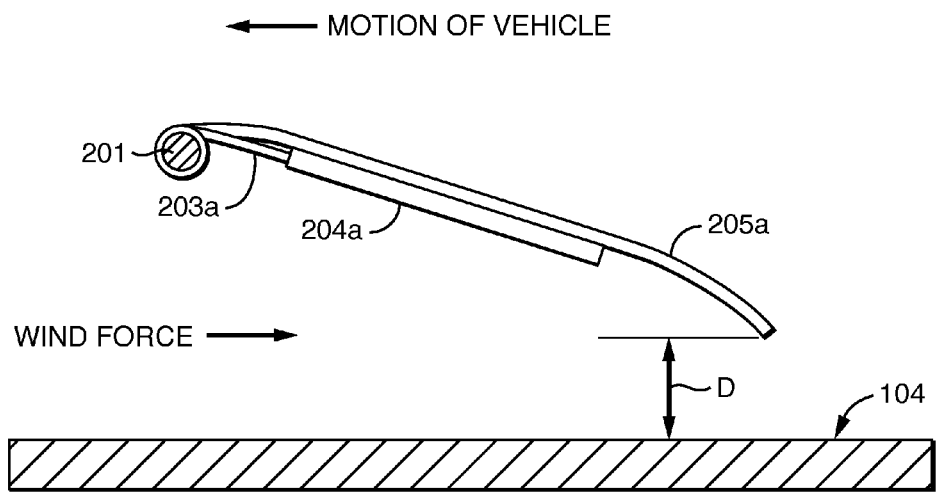
FIG. 4 is another view of the embodiment of FIG. 3 showing directions of vehicle motion and wind force.

Referring to FIG. 4, the components of FIG. 3 are shown in side view. Axel 201 is shown on end. Support 203a is shown on edge, connecting to wind-screen 204a which is also shown on edge. Conductive strip 205a is shown on edge being supported by wind-screen 204a. Clearance "D" is shown in this Fig. as well, and is the same distance "D" shown in FIG. 3. Wind force is directed from the left of the diagram, as shown, as truck 100 moves forward, to the left side in FIG. 1. Windscreen 204a may typically be sized with dimensions of three feet by one foot, but the dimensions can vary depending on the size and shape of the truck under which it is attached. The material from which the wind-screen is made can also vary; it needs to be lightweight and weather-resistant. A light, stiff plastic material or other similar material would he suitable for this purpose.

In operation, referring to FIGS. 1-4, assuming truck 100 was carrying embodiment 200/200a under its carriage rather than chain 105, as truck 100 drives to the left and picks up speed, the wind or breeze created underneath the truck by virtue of its velocity directs wind force against windscreen 204 which causes it to rotate around an axis co-linear with axel 201. That rotation lifts flexible conductive material 205 into the air and creates a clearance of dimension "D" between the end of the conductive material and road surface 104. This clearance reduces the wear opportunities which otherwise would occur upon conductive material 205, and greatly enhances the life of this material. Otherwise, friction forces from road surface 104 being in contact with conductive material 205 while the truck is driving down the road would wear away the material until it no longer made contact with the road surface whereby its effectiveness in grounding the static electricity charge on truck 100 would be substantially if not completely reduced.

Thereafter, when truck 100 comes to a stop, the wind forces on structure 204 are reduced to zero and the force of gravity causes material 205 to make contact with roadsurface 205 (with the Earth). This happens prior to the truck completely stopping and well-prior to anyone inside the truck opening door 106 and disembarking. This is important because it prevents the possibility of the truck driver/passenger from experiencing a static electricity shock, since the grounding from the truck is automatic, instantaneous and in place before the truck occupants open the door (the door is not opened until the truck stops and the static discharge contact between material 205 and roadway 104 is made just as the truck is stopping and before the door is opened.) A motion-limiting strap (not shown) could be attached between windscreen 204a and the underside of the chassis of the truck so that the downward displacement of windscreen 204a is limited to a safe clearance above the roadway. It is not important, or desirable, for windscreen 204a to contact the roadway when the vehicle is stopped; it is important only for the flexible conductive strip to contact the roadway when the vehicle is stopped.

In the embodiment earlier mentioned in which apparatus 202, 203 and 204 are not used, where material 205 is suspended only by axel 201, the fluttering material 205 during vehicle forward motion may possibly still come in contact with the roadway intermittently, depending on vehicle speed, weather conditions, etc. But, this is not equivalent to, and a vast improvement over, the constant wear of the chain discharge mechanism of the prior art. However, if one were to use the embodiment with windscreen 204, this may be an improvement because windscreen 204 may add loft stability to the fluttering discharge material, thereby reducing frequency of contact between material and roadway or eliminating it completely.

Figure 5:
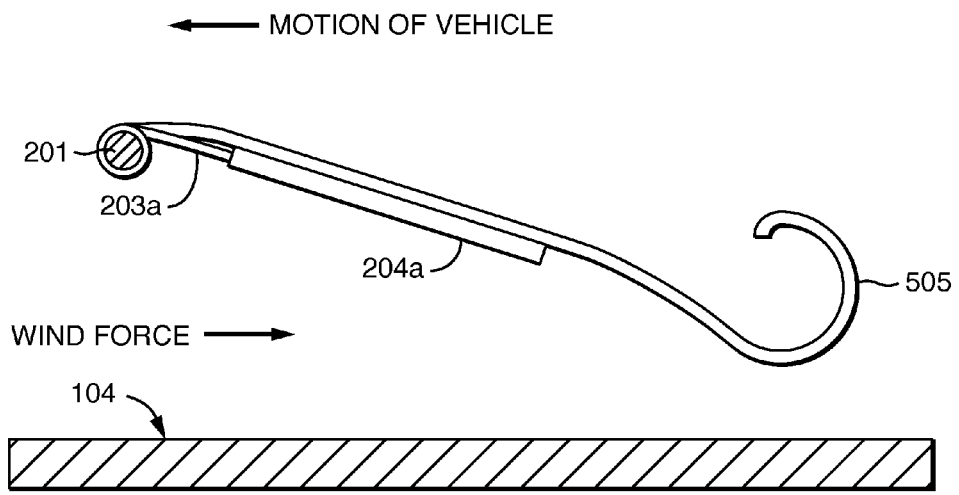
FIG. 5 depicts another embodiment of the present invention which avoids malfunction during vehicle back-up due to debris and/or holes in the roadway.
Figure 6:
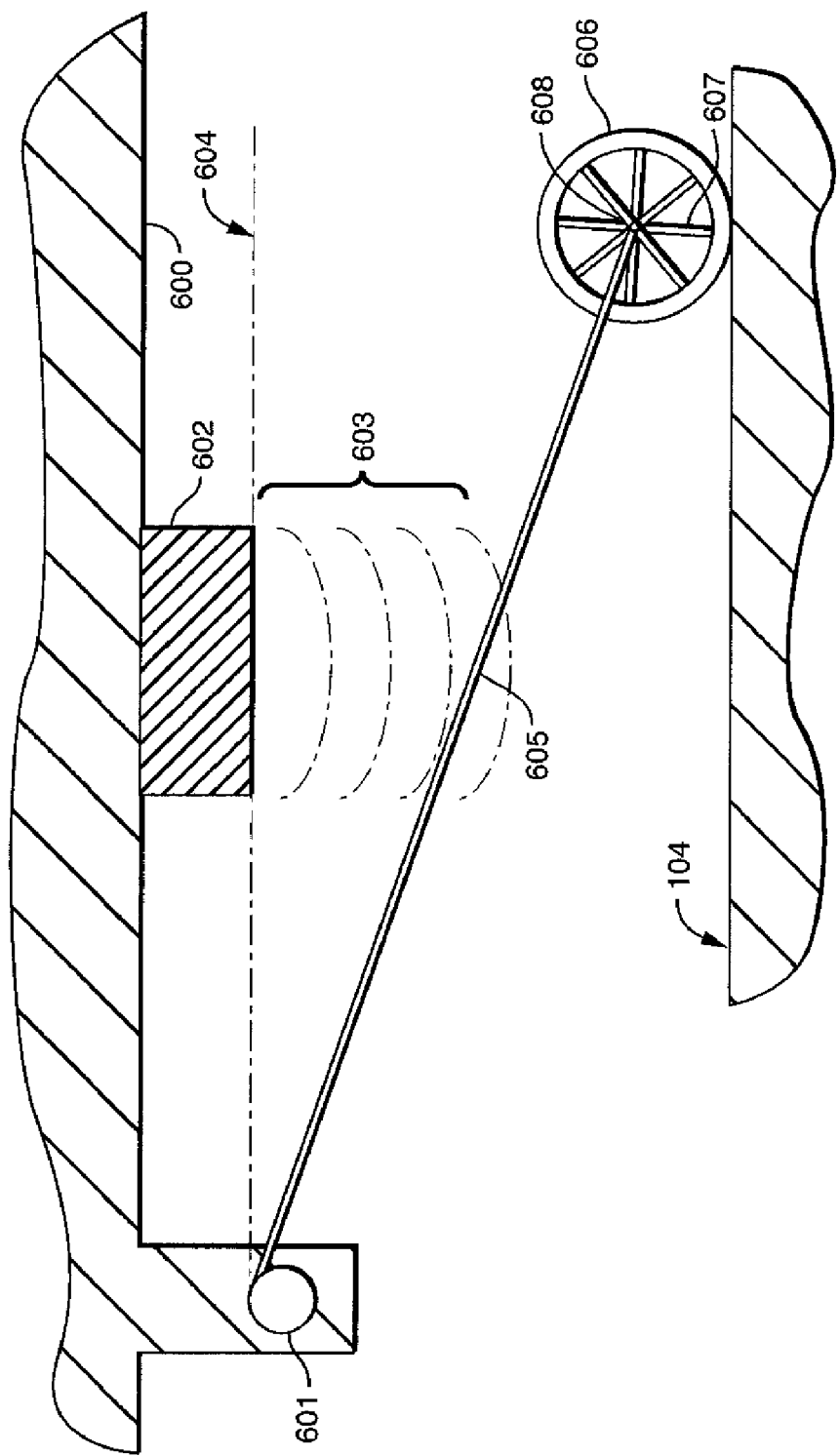
FIG. 6 depicts yet another embodiment of the present invention.

FIG. 5 depicts an embodiment which addresses a backing-up situation where there may be obstructions or potholes in the roadway. In the prior Figs., this was not an issue because material 205 is flexible and therefore would not get locked on a stone lying on the roadway, or in a pot hole formed in the roadway. The flexible material would simply flex around the obstruction or within the hole. However, if other embodiments of the present invention are utilized, such as a conductive rod or spring, although it would not have an issue in proper functioning when moving forward, it could jam against a rock or lodge in a pot hole when the truck is moving backward. In FIG. 5, electrically-conductive rod or spring 505 is depicted which, in this view, has a similar thickness appearance to that of conductive strip 205a. However, although rod or spring 505 is flexible, it is not as flexible as material 205. Therefore, a large curve is formed in the rod or spring to enable it to ride over rocks in the roadway and to slide across potholes in the roadway.

An alternative embodiment in F*ig*. 6 would connect rod 505, labeled 605 in F*ig*. 6, to a conductive rotatable metallic wheel 606 where the wheel is in contact with roadway 104 and has the ability to roll-over rocks and roll across potholes when the truck is moving in a reverse direction. Axel 201, depicted in F*ig*. 6 as axel 601, of a vehicle chassis underside 600 supports metal rod 605 at one end, the other end of the rod being connected to wheel hub 608 of rotatable metal wheel 606 with metal spokes 607. Wheel 606 rolls over roadway 104 when the vehicle moves.

Other more elaborate controls can be instituted as well. A magnetic mechanism 602 which directs a magnetic field 603 from the under chassis 600 to the metal rod 605 can be fashioned, where such field is automatically energized anytime the transmission of the truck is placed in reverse gear. That magnetic force can be used to lift the rod so that it avoids all contact with the roadway when the truck is moving in reverse. Additional controls can be instituted, utilizing the magnetic mechanism, where the rod is held in place above the roadway when the transmission of the truck is placed in any forward gear. Thus, the rod can be held off the ground e.g., at position 604, by magnetic force during forward motion of the truck as well. The critical factor is that contact is made with the roadway no later than the opening of the doors of the truck, and an interlock mechanism with the doors can be used for that purpose, where any door opening causes an over-ride to the energizing of the magnetic mechanism which, in turn, causes the metal rod to fall to the ground. However, these are more elaborate and more expensive controls, and the windscreen technique embodiment and/or the flexible conductive mesh without the windscreen embodiment can perform satisfactorily.

While several illustrative embodiments of the present invention have been shown and described, numerous variations and alternative embodiments may occur to those skilled in the art. Such variations and alternative embodiments are contemplated, and can be made without departing from the spirit and scope of the present invention as defined in the appended claims.

What is claimed is:

1. Apparatus for discharging static electricity from a vehicle on a roadway, comprising:

electrically-conductive material suspended from said vehicle;

means for controlling said material to be in contact with said roadway when said vehicle is stopped and to automatically break said contact when said vehicle is moving in a forward direction wherein said controlling means comprises a wind-engagement mechanism suspended from said vehicle and supporting said material, said mechanism being oriented in a direction to encounter wind resistance when said vehicle is moving forward to cause said mechanism to raise said electrically-conductive material from said roadway and break said contact; and means for avoiding damage to said mechanism if said material encounters debris or holes in said roadway when said vehicle is moving in a reverse direction comprising said electrically conductive material including a metal rod conductively connected at an end of said rod to a rotatable metal wheel which makes contact with said roadway to permit said wheel to roll over said debris or said holes;

whereby said static electricity is discharged from said vehicle through said material to said roadway when said vehicle is stopped and said material does not experience frictional force from said roadway when said vehicle is moving in a forward direction.

2. Apparatus for discharging static electricity from a vehicle on a roadway, comprising:

electrically-conductive material suspended from said vehicle;

means for controlling said material to be in contact with said roadway when said vehicle is stopped and to automatically break said contact when said vehicle is moving in a forward direction wherein said controlling means comprises a wind-engagement mechanism suspended from said vehicle and supporting said material, said mechanism being oriented in a direction to encounter wind resistance when said vehicle is moving forward to cause said mechanism to raise said electrically-conductive material from said roadway and break said contact; and means for avoiding damage to said mechanism if said material encounters debris or holes in said roadway when said vehicle is moving in a reverse direction comprising said electrically conductive material being formed into a metal rod, an end of said rod making contact with said roadway and being curved upward to permit said rod to ride over said debris and slide over said holes;

whereby said static electricity is discharged from said vehicle through said material to said roadway when said vehicle is stopped and said material does not experience frictional force from said roadway when said vehicle is moving in a forward direction.

* * * * *